US012013259B2

(12) United States Patent
Kollmitzer et al.

(10) Patent No.: US 12,013,259 B2
(45) Date of Patent: Jun. 18, 2024

(54) PROVIDING COMPENSATION PARAMETERS FOR SENSOR INTEGRATED CIRCUITS

(71) Applicant: Infineon Technologies AG, Neubiberg (DE)

(72) Inventors: Benjamin Kollmitzer, Graz (AT); Stephan Leisenheimer, Deisenhofen (DE); Mario Motz, Wernberg (AT); Bernhard Schaffer, Villach (AT)

(73) Assignee: Infineon Technologies AG, Neubiberg (DE)

( * ) Notice: Subject to any disclaimer, the term of this patent is extended or adjusted under 35 U.S.C. 154(b) by 302 days.

(21) Appl. No.: 16/143,171

(22) Filed: Sep. 26, 2018

(65) Prior Publication Data

US 2020/0096363 A1    Mar. 26, 2020

(51) Int. Cl.
  *G01D 3/02* (2006.01)
  *H04B 1/04* (2006.01)
  *H04B 1/16* (2006.01)

(52) U.S. Cl.
  CPC ............ *G01D 3/022* (2013.01); *H04B 1/04* (2013.01); *H04B 1/16* (2013.01)

(58) Field of Classification Search
  CPC .................................................. G01D 3/022
  See application file for complete search history.

(56) References Cited

U.S. PATENT DOCUMENTS

| 5,355,129 | A | * | 10/1994 | Baumann | ........ G01D 3/022 |
| | | | | | 324/601 |
| 5,848,383 | A | | 12/1998 | Yunus | |
| 6,304,827 | B1 | | 10/2001 | Blixhawn et al. | |
| 10,393,555 | B2 | | 8/2019 | Dirk Hammerschmidt | |
| 10,805,093 | B2 | | 10/2020 | Van Der Sluis et al. | |
| 10,936,832 | B2 | | 3/2021 | Lin et al. | |
| 2003/0204743 | A1 | * | 10/2003 | Devadas | .......... G06F 21/72 |
| | | | | | 257/E23.179 |

(Continued)

FOREIGN PATENT DOCUMENTS

| CN | 103543700 A | 1/2014 |
| CN | 104782076 A | 7/2015 |

(Continued)

OTHER PUBLICATIONS

Udo Ausserlechner et al. "Compensation of the Piezo-Hall Effect in Integrated Hall Sensors on (100)-Si", IEEE Sensors Journal, vol. 7, No. 11, Nov. 2007, 1475-1482, 8 pages.

*Primary Examiner* — Hyun D Park
(74) *Attorney, Agent, or Firm* — Harrity & Harrity, LLP

(57) ABSTRACT

A device may determine a sensor identifier corresponding to a sensor integrated circuit (IC) associated with a sensor system. The device may provide the sensor identifier corresponding to the sensor IC. The device may receive, based on providing the sensor identifier, compensation parameter information associated with the sensor IC. The device may cause a set of compensation parameters, associated with the compensation parameter information, to be stored on a controller associated with the sensor system. The set of compensation parameters may include one or more parameters associated with correcting a measurement performed by the sensor IC or a safety result provided by the sensor IC.

20 Claims, 10 Drawing Sheets

(56) References Cited

U.S. PATENT DOCUMENTS

| | | | |
|---|---|---|---|
| 2009/0083833 A1* | 3/2009 | Ziola | G06F 21/31 |
| | | | 726/2 |
| 2010/0153047 A1* | 6/2010 | Youssefi | G16H 40/40 |
| | | | 702/85 |
| 2015/0269378 A1 | 9/2015 | Falk | |
| 2016/0131477 A1* | 5/2016 | Goto | G01B 5/20 |
| | | | 702/94 |
| 2017/0016792 A1* | 1/2017 | Shepherd | G01D 18/008 |
| 2017/0243413 A1 | 8/2017 | Haggerty et al. | |
| 2018/0006830 A1* | 1/2018 | Cambou | G06F 11/2268 |
| 2018/0024015 A1* | 1/2018 | Berme | G01L 5/107 |
| | | | 73/760 |
| 2018/0183613 A1* | 6/2018 | Dafali | G09C 1/00 |
| 2019/0103974 A1* | 4/2019 | Zhou | H04L 9/3278 |

FOREIGN PATENT DOCUMENTS

| | | |
|---|---|---|
| CN | 105706114 A | 6/2016 |
| CN | 107004380 A | 8/2017 |
| CN | 107218961 A | 9/2017 |
| CN | 108225400 A | 6/2018 |
| EP | 1 235 053 | 8/2002 |
| EP | 1 548 417 | 6/2005 |

\* cited by examiner

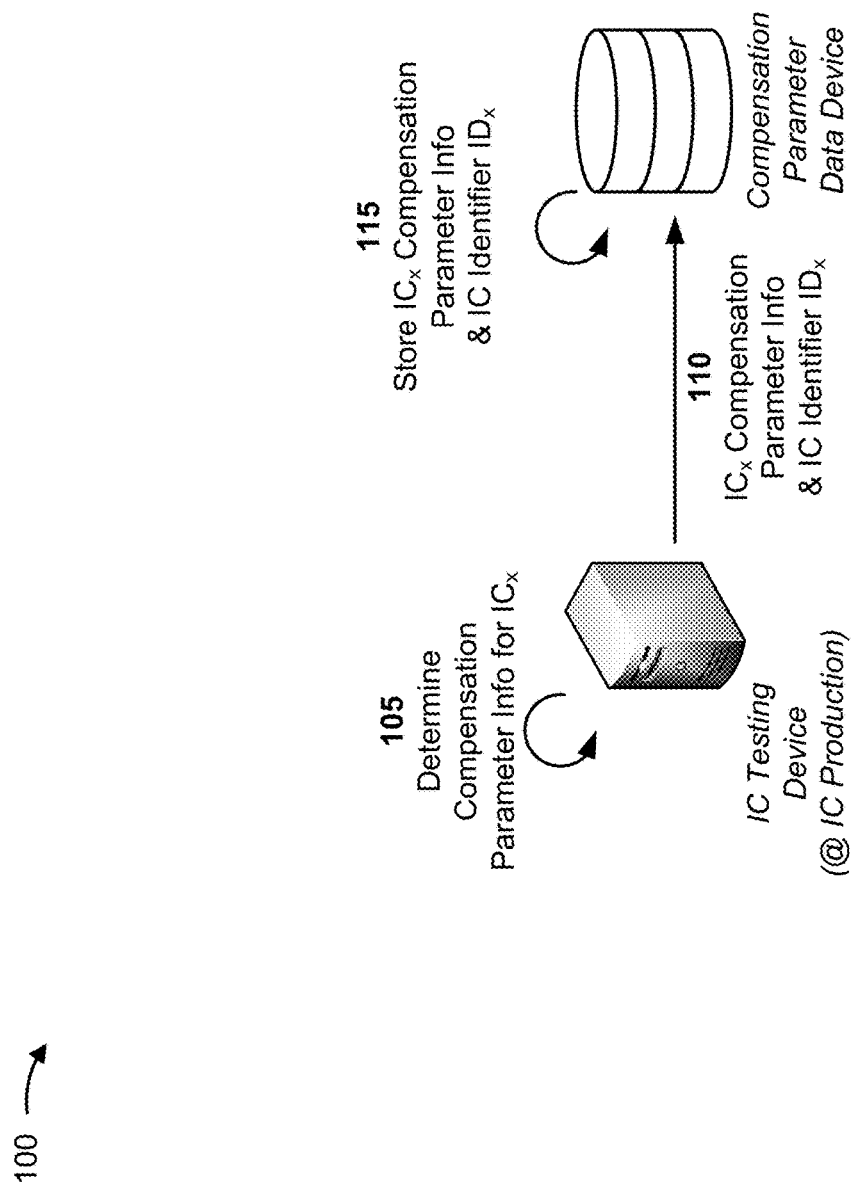

PROVIDING COMPENSATION PARAMETERS FOR SENSOR INTEGRATED CIRCUITS

BACKGROUND

A sensor integrated circuit (IC) (sometimes referred to as a sensor chip) is a device that can be used to measure a physical property, and provide an output corresponding to a value of the measurement. For example, a sensor IC may be designed to measure a temperature, an amount of mechanical stress, a pressure, a supply voltage, a strength of an electro-magnetic field component, and/or the like, and provide an output (e.g., an electrical signal) representing the value of the measurement.

SUMMARY

According to some possible implementations, a method may include determining, by a device, a sensor identifier corresponding to a sensor integrated circuit (IC) associated with a sensor system; providing, by the device, the sensor identifier corresponding to the sensor IC; receiving, by the device and based on providing the sensor identifier, compensation parameter information associated with the sensor IC; and causing, by the device, a set of compensation parameters, associated with the compensation parameter information, to be stored on a controller associated with the sensor system, wherein the set of compensation parameters includes one or more parameters associated with correcting a measurement performed by the sensor IC or a safety result provided by the sensor IC.

According to some possible implementations, a method may include receiving, by a device, a sensor identifier corresponding to a sensor integrated circuit (IC) associated with a sensor system; determining, by the device and based on the sensor identifier, compensation parameter information associated with the sensor IC; and providing, by the device, the compensation parameter information in association with causing a set of compensation parameters, associated with the compensation parameter information, to be stored on a controller associated with the sensor system, wherein the set of compensation parameters includes one or more parameters associated with correcting a measurement performed by the sensor IC or a safety result provided by the sensor IC.

According to some possible implementations, one or more devices may include one or more processors to determine an identifier that identifies an integrated circuit (IC) associated with a system; obtain, based on the identifier, compensation parameter information associated with the IC; determine, based on the compensation parameter information, a set of compensation parameters associated with a correcting measurement performed by the IC or a safety result provided by the IC; and cause the set of compensation parameters to be stored on a controller associated with the system.

BRIEF DESCRIPTION OF THE DRAWINGS

FIGS. 1A-1C are diagrams of an example implementation of providing compensation parameters for sensor integrated circuits, as described herein.

DETAILED DESCRIPTION

Figure 1A:
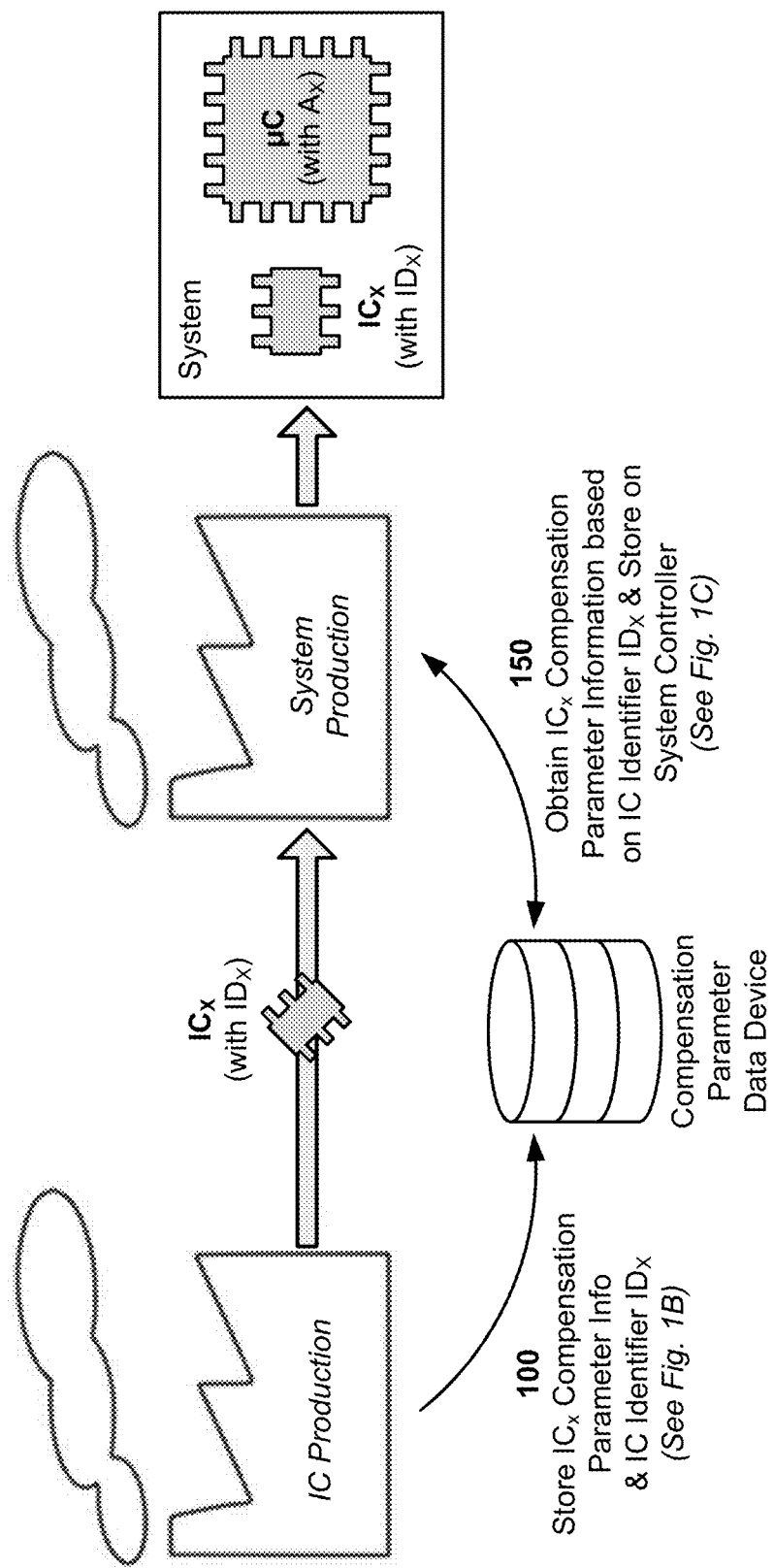

The following detailed description of example implementations refers to the accompanying drawings. The same reference numbers in different drawings may identify the same or similar elements.

A sensor IC is generally sensitive not only to a physical property which the sensor IC is intended to quantize, but is also sensitive to other physical properties. As an example, a magnetic sensor IC should be sensitive to a magnetic field (e.g., such that the sensor IC can measure a strength of the magnetic field), but may also be sensitive to temperature (e.g., such that an output of the sensor IC depends on not only the magnetic field strength, but also depends on an ambient temperature).

In some cases, such a cross-dependency can be reduced or eliminated via digital compensation. In order to achieve this, both the physical property of interest and the other physical property should be measured. For example, in the case of the above described magnetic sensor IC, both the magnetic field strength and the ambient temperature should be measured. Next, an algorithm (including a set of mathematical operations) can be performed using the measured values of the physical properties and one or more pre-defined parameters (sometimes referred to as compensation parameters or sensor coefficients) in order to correct the measured value of the physical property of interest.

In some cases, the algorithm can be complicated and—if implemented in the digital domain—may require mathematical processing using, for example, an arithmetic logical unit (ALU), a digital signal processor (DSP), a microcontroller (μC), and/or another type of processing unit.

In general, the set of compensation parameters quantify not only cross-dependencies associated with the sensor IC, but are also used to correct a response of the sensor IC. For example, a possible offset of the sensor IC (e.g., an output signal at a specific external signal of interest), a sensitivity of the sensor IC, a linear temperature dependence of the sensor IC, a quadratic dependency of the sensor IC, and/or the like, can be described by the set compensation parameters and corrected, accordingly.

Various techniques exist to derive an appropriate set of compensation parameters for a given sensor IC. For example, the set of compensation parameters can be deduced from mathematical models of the sensor IC, from measurements of other sensor ICs that are similar to the sensor IC (e.g., sensor ICs that have the same design), from measurements of the sensor IC itself, or from some combination thereof. Due to a high achievable parallelism, efficient measurements are often possible during production of the sensor IC on a wafer-level in front-end processing and/or after packaging in back-end processing.

Further, sensor ICs (or other ICs) that can be used in, for example, an automotive application may need to meet one or more safety requirements of ISO 26262. For such an application where functional safety is needed—and in general to increase diagnostic coverage—one or more dedicated diagnosis components (herein referred to as safety-mechanisms (SMs)) can be implemented in the sensor IC. A purpose of the SM is to detect a failure of the sensor IC (or a related item). A safety threshold associated with a given SM can be used to distinguish acceptable performance from unacceptable performance. For example, if a result determined by the SM does not satisfy an applicable threshold (e.g., is outside of an applicable safety limit), then a fault is detected and the system can be caused to enter a safe state. Conversely, if the result determined by the SM satisfies the applicable threshold (e.g., is within the applicable safety limit), then normal operation can continue.

As a particular example, in the case of an automotive 3D magnetic Hall sensor, a SM can be implemented in order to perform a spin-test. The spin-test measures an offset of Hall probes of the sensor IC and an offset of an analog to digital converter of the sensor IC. In a typical magnetic sensor measurement, however, these "raw" offsets are eliminated by chopping and/or current spinning. Nevertheless, excessive offset drifts may impair magnetic sensor measurements (even with chopping and current spinning), due to clipping of the sensor signals. Such offset drifts will also modify the result of the spin-test and, thus, are detectable. In other words, the spin-test can provide diagnostic coverage for certain failures of the Hall probes.

Similar to a sensor IC itself as described above, a given SM of the sensor IC can be influenced by physical properties at or near the sensor IC that are not of interest to the SM. Therefore, the related safety thresholds may need to account for any unintentional cross-dependencies in order to, for example, prevent false alarms. This reduces the achievable resolution and diagnostic coverage. As a particular example, for the 3D magnetic Hall sensor described above, the spin-test result changes with changing temperature. Thus, as compared to results at room-temperature, a safety threshold may need to be expanded in order to accommodate an operating temperature range.

As with other measurements provided by a given sensor IC, a result provided by the SM (herein referred to as a safety result) can be compensated. For example, nomenclature for compensating a SM ($SM_1$) for changes of temperature (T) and mechanical stress (S) would be:

$$SM_{1,comp} = f(SM_1, T, S; A)$$

Where $f$ denotes a compensation function, and A represents one or more SM compensation parameters (e.g., a vector of compensation coefficients) associated with compensating a raw measurement by the SM.

Depending on sensor IC and safety concepts, the one or more SM compensation parameters could be derived from a set of compensation parameters associated with a sensor signal of interest. For example, the spin-test of the 3D magnetic Hall sensor, described above, could show a similar temperature-dependence as a residual magnetic offset. Typically, digital compensation is performed by the sensor IC or in an external microcontroller. The one or more SM compensation parameters could be determined during characterization and/or sample-fine during production (e.g., in front end (FE) or back end (BE)).

Closely related to performance of a sensor IC is the issue of verifying that a set of compensation parameters match the particular sensor IC. This may be trivial in a case in which the set of compensation parameters is stored on the sensor IC (e.g., in a memory component of the sensor IC), but is a significant concern in a case where the set of compensation parameters, or compensation parameter information (i.e., information from which the set of compensation parameters can be determined) is stored at a location that is physically separated from the sensor IC.

Another issue is a capability to authenticate a sensor IC (e.g., a capability to differentiate genuine sensor ICs from manipulated sensor ICs, or even counterfeit sensor ICs). This is of particular concern due to increasing presence of driver assist systems and autonomous driving since increased responsibility is taken over by automotive electrical and/or electronic systems comprising sensor ICs (e.g., since only genuine sensor ICs may be trusted to perform according to specification). Thus, to prevent unreasonable risk of possible failure and/or unpredictability, authentication of a sensor IC is advisable.

Conventionally, a set of compensation parameters (including one or more SM compensation parameters) is stored on a sensor IC, and measurement compensation and safety result compensation is performed by the sensor IC. This can be achieved when the sensor IC includes an at least one-time programmable memory component and a processing unit (e.g., an ALU, a DSP, and/or the like). However, the memory component and the processing unit, by their presence on the sensor IC, require a certain, non-negligible chip area, which can result in the sensor IC having an undesirably high cost, large size, and/or high complexity. An alternative approach is to calibrate and store the set of compensation parameters externally. However, this approach results in significant calibration overhead at late stages of production and, therefore, is undesirable.

With regard to authentication of a given sensor IC, identification of a counterfeit sensor IC typically relies on inspection of a package marking, a shipping label, and/or the like. As such, the authentication process is difficult to automate and is error prone.

Some implementations described herein provide techniques and processes for storing a set of compensation parameters, associated with a sensor IC of a sensor system, on a controller associated with the sensor system, such that the controller can perform compensation (e.g., measurement compensation associated with a physical property of interest, safety result compensation associated with an SM implemented on the sensor IC, and/or the like) based on raw data provided by the sensor IC. In some implementations, the set of compensation parameters is stored on the controller based on being obtained from a compensation parameter data structure maintained on a compensation parameter data device that is external to both the sensor IC and the sensor system itself. As such, the sensor IC need not include a memory component capable of storing the set of compensation parameters, or a processing unit for correcting sensor measurements, thereby reducing cost, size, and complexity of the sensor IC. Further, compensation parameter information, associated with the set of compensation parameters, can be stored on the external compensation parameter data device during production of the sensor IC, thereby reducing calibration overhead at later stages of sensor IC production (e.g., as compared to the alternative approach described above).

Some implementations described herein further provide techniques and processes for verification of compensation parameter information. For example, during production of a sensor IC, first verification information (e.g., a hash value computed based on one or more items of compensation parameter information associated with the sensor IC) can be stored on the sensor IC. Here, during production of a sensor system that includes the sensor IC, second verification information can be determined based on compensation parameter information received from the external compensation parameter data device. The first and second verification information can then be compared (e.g., in order to determine whether the first verification information matches the second verification information), thereby enabling verification that the received compensation parameter information corresponds to the sensor IC.

Some implementations described herein further provide techniques and processes for authenticating a sensor IC. For example, in some implementations, a first value of a physical unclonable function (PUF) parameter, associated with the sensor IC, can be stored in the compensation parameter data structure on the compensation parameter data device during production of the sensor IC. A second value of the PUF parameter can be independently measured during production of the sensor system. Here, the first and second values of the PUF parameter can be compared (e.g., in order to determine whether the first value of the PUF matches the second value of the PUF), thereby enabling sensor IC authentication in an automated and reliable manner.

Additional details regarding the above described aspects are provided below.

Figure 1C:
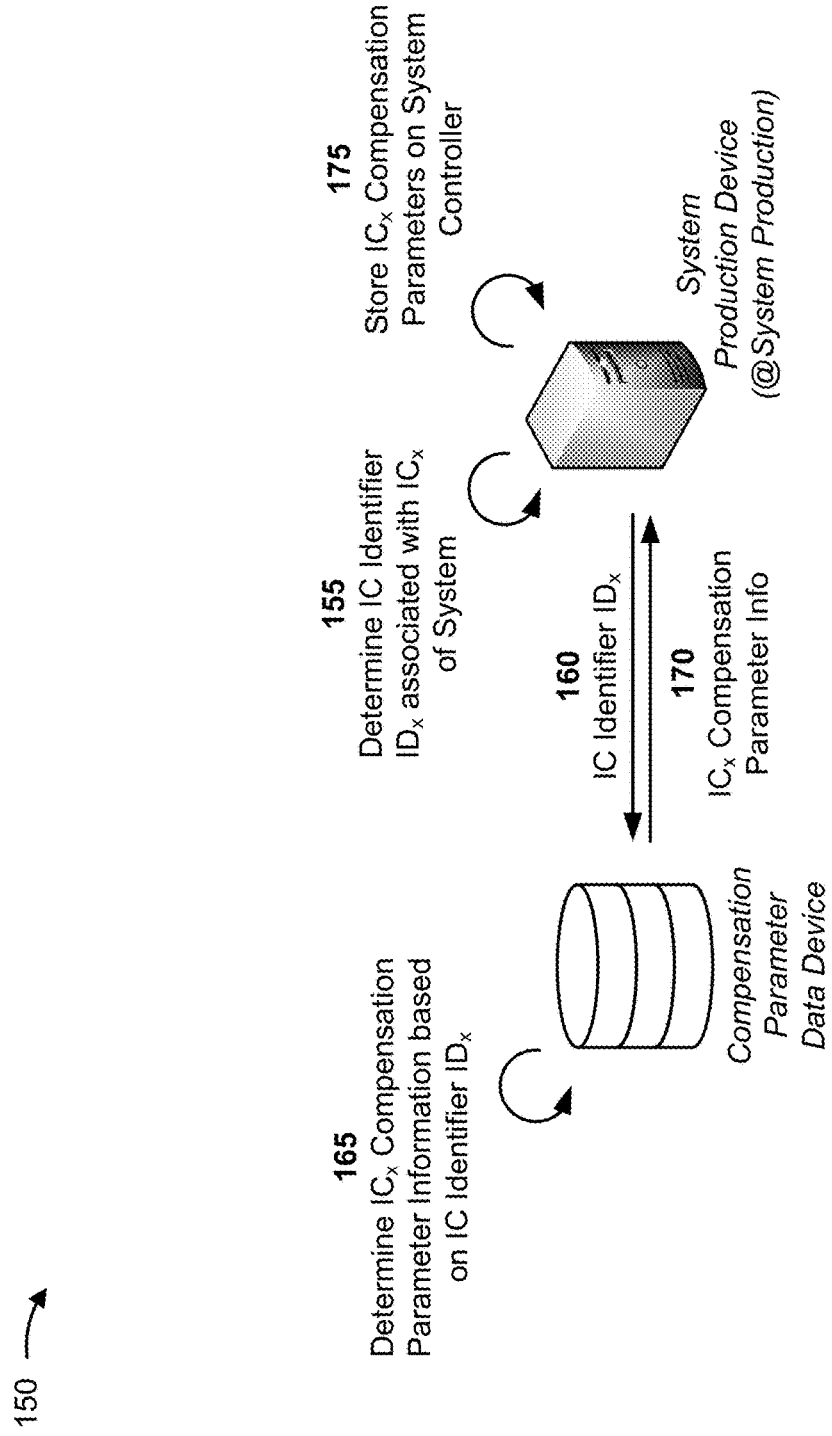

FIGS. 1A-1C are diagrams of an example implementation of providing compensation parameters for sensor ICs, as described herein. For the purposes of FIG. 1A, sensor ICs are to be produced at an IC production facility, and sensor systems (e.g., a system including one or more sensor ICs, a controller (C), and/or other components) are to be produced at a system production facility. Notably, while the techniques and processes described herein are described in the context of sensor ICs, these techniques and processes can be applied in association with any other type of IC for which compensation is needed. In other words, the techniques and processes described herein are not limited to use in association with sensor ICs, but may be used in association with other types of ICs.

As shown in FIG. 1A, a sensor IC (e.g., ICx) is produced at the IC production facility. The sensor IC may include one or more sensor components (e.g., one or more components associated with measuring a physical property), one or more SM components (e.g., one or more components associated with assessing functional safety), a memory component (e.g., an electrically erasable programmable read-only memory component (EEPROM)), an analog to digital convertor (ADC), a digital interface, and/or the like. In some implementations, as shown in FIG. 1A, the memory component of the sensor IC may store a sensor identifier (e.g., IDx) associated with identifying the sensor IC.

In some implementations, as shown in FIG. 1A, a process 100 can be performed in order to store compensation parameter information associated with the sensor IC on a compensation parameter data device. An illustrative example of process 100 is shown in FIG. 1B.

As shown in FIG. 1B, and by reference number 105, an IC testing device may determine compensation parameter information associated with the sensor IC. In some implementations, the IC testing device includes a device that is capable of determining, measuring, calculating, or otherwise obtaining compensation parameter information associated with sensor ICs. In some implementations, as indicated, the IC testing device may be located at the IC production facility.

The compensation parameter information includes information based on which a set of compensation parameters, associated with correcting a measurement or a safety result provided by the sensor IC, can be determined. For example, the compensation parameter information may include compensation data (e.g., raw data) associated with the sensor IC, based on which the set of compensation parameters can be calculated (e.g., using a compensation parameter algorithm). As another example, the compensation parameter information may include the set of compensation parameters (e.g., when the set of compensation parameters is calculated at the IC production facility by IC testing device or another device).

In some implementations, the compensation parameter information may include information associated with one or more parameters that to be used to correct a measurement of a physical property of interest as measured by a sensor component of the sensor IC. For example, in the case of a magnetic field sensor, the compensation parameter information may include information associated with one or more parameters that can be used to correct a strength of (one or more components of) a magnetic field as measured by a sensor component of the sensor IC. Additionally, or alternatively, the compensation parameter information may include information associated with one or more parameters that can be used to correct a safety result provided by a SM implemented on the sensor IC. For example, in the case of the magnetic field sensor, the compensation parameter information may include information associated with one or more parameters that can be used to correct a result of a spin-test as determined by a SM of the sensor IC.

In some implementations, the compensation parameter information may include compensation parameter information that is unique to the sensor IC. For example, the compensation parameter information may include raw compensation data obtained using the sensor IC itself, a set of compensation parameters calculated from raw compensation data obtained using the sensor IC itself, and/or the like.

In some implementations, the compensation parameter information may include global compensation parameter information that is associated with a group of sensor ICs including the sensor IC. For example, the compensation parameter information may include raw compensation data obtained using one or more sensor ICs that are similar to the sensor IC (e.g., sensors IC with the same design), a set of compensation parameters calculated from raw compensation data obtained using one or more sensor ICs that are similar to the sensor IC, and/or the like.

In some implementations, the compensation parameter information may include a combination of compensation parameter information that is unique to the sensor IC and global compensation parameter information.

As further shown in FIG. 1B, by reference number 110, the IC testing device may provide the compensation parameter information, associated with the sensor IC, and the sensor identifier associated with the sensor IC.

As shown by reference number 115, the compensation parameter data device may receive the compensation parameter information and the sensor identifier, and may store the compensation parameter information and the sensor identifier (e.g., in a compensation parameter data structure maintained by the compensation parameter data device). Here, the compensation parameter data device stores an association between the compensation parameter information and the sensor identifier (e.g., such that the compensation parameter information, associated with the sensor IC, can be retrieved, at a later time, based on the sensor identifier associated with the sensor IC).

Returning to FIG. 1A, assume that after the compensation parameter information and the sensor identifier have been provided to the compensation parameter data device, the sensor IC is received at the system production facility. As shown in FIG. 1A, a process 150 can be performed in order to obtain the compensation parameter information, associated with the sensor IC, such that a set of compensation parameters (Ax), associated with the sensor IC, can be stored on a sensor system that includes the sensor IC. An illustrative example of process 150 is shown in FIG. 1C.

As shown in FIG. 1C, and by reference number 155, a system production device may determine the sensor identifier corresponding to the sensor IC. In some implementations, the system production device includes a device that is capable of obtaining compensation parameter information associated with the sensor IC, and causing a set of compensation parameters, associated with the compensation parameter information, to be stored on a controller of the sensor system including the sensor IC. In some implementations, as indicated, the system production device may be located at the system production facility. In some implementations, the system production device may determine the sensor identifier ID based on the sensor identifier being stored on the sensor IC. For example, the system production device can retrieve the sensor identifier from the memory component of the sensor IC in order to determine the sensor identifier.

As shown by reference number 160, the system production device may provide the sensor identifier corresponding to the sensor IC. For example, as shown, the system production device can provide the sensor identifier to the compensation parameter data device. In some implementations, the sensor identifier may be included in a request that the compensation parameter data device provide compensation parameter information associated with the sensor identifier. In such a case, the system production device may provide the request.

As shown by reference number 165, the compensation parameter data device may receive the sensor identifier, and may determine, based on the sensor identifier, the compensation parameter information associated with the sensor IC. For example, the compensation parameter data device can, based on the stored association between the sensor identifier and the compensation parameter information, retrieve the compensation parameter information, associated with the sensor IC, from the compensation parameter data structure.

As shown by reference number 170, the compensation parameter data device may provide the compensation parameter information to the system production device. For example, the compensation parameter data device may provide the compensation parameter information in a response to the request provided by the system production device.

As shown by reference number 175, the system production device may receive the compensation parameter information associated with the sensor IC, and may cause the sensor identifier and a set of compensation parameters, associated with the compensation parameter information, to be stored on the controller of the sensor system. For example, if the compensation parameter information includes raw compensation data associated with the sensor IC, then the system production device may calculate the set of compensation parameters (e.g., using a compensation parameter algorithm) and may provide information associated with the set of compensation parameters for storage on the controller. As another example, if the compensation parameter information includes the set of compensation parameters, then the system production device may provide information associated with the set of compensation parameters for storage on the controller. Here, the controller stores an association between the sensor identifier and the set of compensation parameters (e.g., such that the set of compensation parameters, associated with the sensor IC, can be retrieved, at a later time, based on the sensor identifier associated with the sensor IC).

In this way, a set of compensation parameters (e.g., including one or more parameters associated with correcting a measurement of a physical property of interest, including one or more parameters associated with correcting a result provided by a SM implemented on the sensor IC, and/or the like), associated with the sensor IC of the sensor system, can be stored on a controller associated with the sensor system, thereby enabling the controller to perform measurement compensation based on raw measurements provided by the sensor IC. For example, in operation, the sensor IC may provide a signal representing the raw measurement and the sensor identifier associated with the sensor IC. Here, the controller can receive the signal and the sensor identifier, and determine, based on the sensor identifier, the set of compensation parameters associated with the sensor IC. The controller can then perform measurement compensation on the raw measurements using the set of compensation parameters. As such, the sensor IC need not include a memory component capable of storing the set of compensation parameters, or a processing unit for correcting sensor measurements, which provides significant savings in terms of sensor IC cost, size, and complexity.

In some implementations, the controller may be capable of performing elaborate mathematical operations for compensation, and may have a large amount of memory space (e.g., as compared to a conventional sensor IC). This allows the set of compensation parameters to be stored with high precision, and/or allows look-up tables with interpolation to be implemented. Thus, improved sensing can be achieved. Further, the processing unit of the controller may be readily able to calculate higher order compensation polynomials, nonlinear compensation functions (e.g., splines, piecewise linear, and/or the like), multivariate compensation functions (e.g., multivariate polynomials, spline (hyper)-surfaces, and/or the like), which may improve compensation (e.g., as compared to what is achievable with a conventional sensor IC).

In some implementations, multiple sensor ICs can be connected to the controller. In such a case, computational and storage capacities of the controller could be shared among the multiple sensor ICs, thereby multiplying the achievable benefit. This means that multiple inexpensive, small sensor ICs could be compensated by a single controller with high resolution to yield excellent accuracy. Further, use of the single controller saves chip area for each connected sensor IC.

In some implementations, a channel via which the compensation parameter information is provided (e.g., from the IC production facility to the compensation parameter data structure and from the compensation parameter data structure to the to the system production facility) may be separate from a channel via which the sensor IC itself is provided (e.g., from the IC production facility to the system production facility). This separate information channel could be any means of transporting information. For example, a network (e.g., the Internet), database access, e-mail, fax, mail, physical memory device (e.g., a hard-drive, a USB-drive, a compact disc, and/or the like), written or printed medium, oral communication, or so on may be used as the channel.

In some implementations, a process may be implemented in order to enable verification of compensation parameter information received by the system production device. For example, in some implementations, first verification information can be stored on the sensor IC (e.g., in addition to the sensor identifier) during production of the sensor IC. The first verification information may include information computed, calculated, or otherwise determined based on compensation parameter information, associated with the sensor IC, during production of the sensor IC. The first verification information can, for example, include a hash value computed based on one or more items of the compensation parameter information corresponding to the sensor IC.

In some implementations, during system production, the system production device can determine the first verification information (e.g., based on the first verification information being stored on the sensor IC). Next, after receiving compensation parameter information from the compensation parameter data device, the system production device may compute second verification information. The second verification information may include information computed, calculated, or otherwise determined based on compensation parameter information received from the compensation parameter data device during production of the sensor system including the sensor IC. The second verification information can, for example, include a hash value computed based on one or more items of the compensation parameter information received from the compensation parameter data device. In some implementations, the system production device then determines whether the second verification information matches the first verification information. The system production device may then verify that the received compensation parameter information corresponds to the sensor IC (e.g., when the second verification information matches the first verification information) or determine that the compensation parameter information does not correspond to the sensor IC (e.g., when the second verification information does not match the first verification information). In this way, compensation parameter information verification can be provided.

In a case where the system production device verifies that the received compensation parameter information corresponds to the sensor IC, the system production device may proceed with causing the set of compensation parameters to be stored on the controller of the sensor system. Conversely, in a case where the system production device determines that the compensation parameter information does not correspond to the sensor IC, the system production device may not proceed with causing the set of compensation parameters to be stored on the controller and/or may take another action (e.g., sending a verification error message to a system producer, recalculating the second verification information and retrying verification, re-requesting the compensation parameter information, and/or the like).

In some implementations, a process may be implemented in order to enable authentication of the sensor IC. In some implementations, such a process may utilize values of a physical unclonable function (PUF) parameter associated with the sensor IC. Generally, a value of a PUF parameter can serve as a unique identity for a given sensor IC, since the value of the PUF is based on physical variations that occur naturally during production and, therefore, makes it possible to differentiate the sensor IC from otherwise identical sensor ICs.

In some implementations, in order to enable sensor IC authentication, a first value of a PUF parameter associated with the sensor IC can be determined. The first value of the PUF parameter may include a value representing an output provided by the sensor IC under a specific condition, as determined by the IC testing device during testing of the sensor IC at production. For example, the first value of the PUF parameter may include a value representing an offset of the sensor IC at a particular temperature (e.g., 25° C.), as determined by the IC testing device during testing of the sensor IC. The first value of the PUF parameter can then be stored on the compensation parameter data device along with the compensation parameter information.

In some implementations, a first value of the PUF parameter may be included in compensation parameter information provided by the compensation parameter data device. For example, upon receiving a sensor identifier from the system production device, the compensation parameter data device may determine, based on the sensor identifier, a first value of a PUF parameter (e.g., by identifying the first value of the PUF parameter that is associated with the sensor identifier). Here, the compensation parameter data device may provide the first value of the PUF parameter to the system production device (e.g., the first value of the PUF parameter may be included in the compensation parameter information provided by the compensation parameter data device). In this example, the system production device may determine (e.g., measure, obtain, receive, and/or the like) a second value of the PUF parameter associated with the sensor IC for which compensation parameter information is sought. In some implementations, the system production device then determines whether the second value of the PUF parameter matches (e.g., within a threshold) the first value of the PUF parameter. The system production device may then authenticate the sensor IC (e.g., when the second value of the PUF parameter matches the first value of the PUF parameter) or determine that the sensor IC is not authentic (e.g., when the second value of the PUF parameter does not match the first value of the PUF parameter). In this way, the system production device can selectively authenticate the sensor IC.

In some implementations, the compensation parameter data device (or another device other than the system production device) can perform authentication, in which case the first value of the PUF may not be provided to the system production device. For example, the system production device may determine (e.g., measure, obtain, receive, and/or the like) a second value of the PUF parameter associated with the sensor IC for which compensation parameter information is sought. The system production device may then transmit, to the compensation parameter data device, the second value of the PUF parameter and an authentication request including the sensor identifier and information that identifies the second value of the PUF parameter. Here, the compensation parameter data device, upon receiving the sensor identifier from the system production device, the compensation parameter data device may determine a first value of a PUF parameter. In this example, the compensation parameter data device may determine whether the second value of the PUF parameter matches the first value of the PUF parameter. The compensation parameter data device may determine whether the sensor IC is authentic (e.g., based on whether the second value of the PUF parameter matches the first value of the PUF parameter), and may transmit, to the system production device, an authentication response indicating whether the sensor IC has been authenticated. The system production device may receive the authentication response, and act accordingly. In this way, the compensation parameter data device (or another device remote from the system production facility) can selectively authenticate the sensor IC.

In a case where the sensor IC is authenticated (e.g., by the system production device, the compensation parameter data device, and/or the like), the system production device may be permitted to proceed with causing the set of compensation parameters to be stored on the controller of the sensor system. Conversely, in a case where the sensor IC is not authenticated, the system production device may not be permitted to proceed with causing the set of compensation parameters to be stored on the controller. In such a case, the authenticating device (e.g., the system production device, the compensation parameter data device, and/or the like) may take another action, such as sending a failed authentication message to a system producer and/or a sensor IC producer, re-determining the second value of the PUF parameter and retrying authentication, preventing the sensor IC from being included in the sensor system, and/or the like).

As indicated above, FIGS. 1A-1C are provided merely as examples. Other examples are possible and may differ from what was described with regard to FIGS. 1A-1C.

Figure 2:
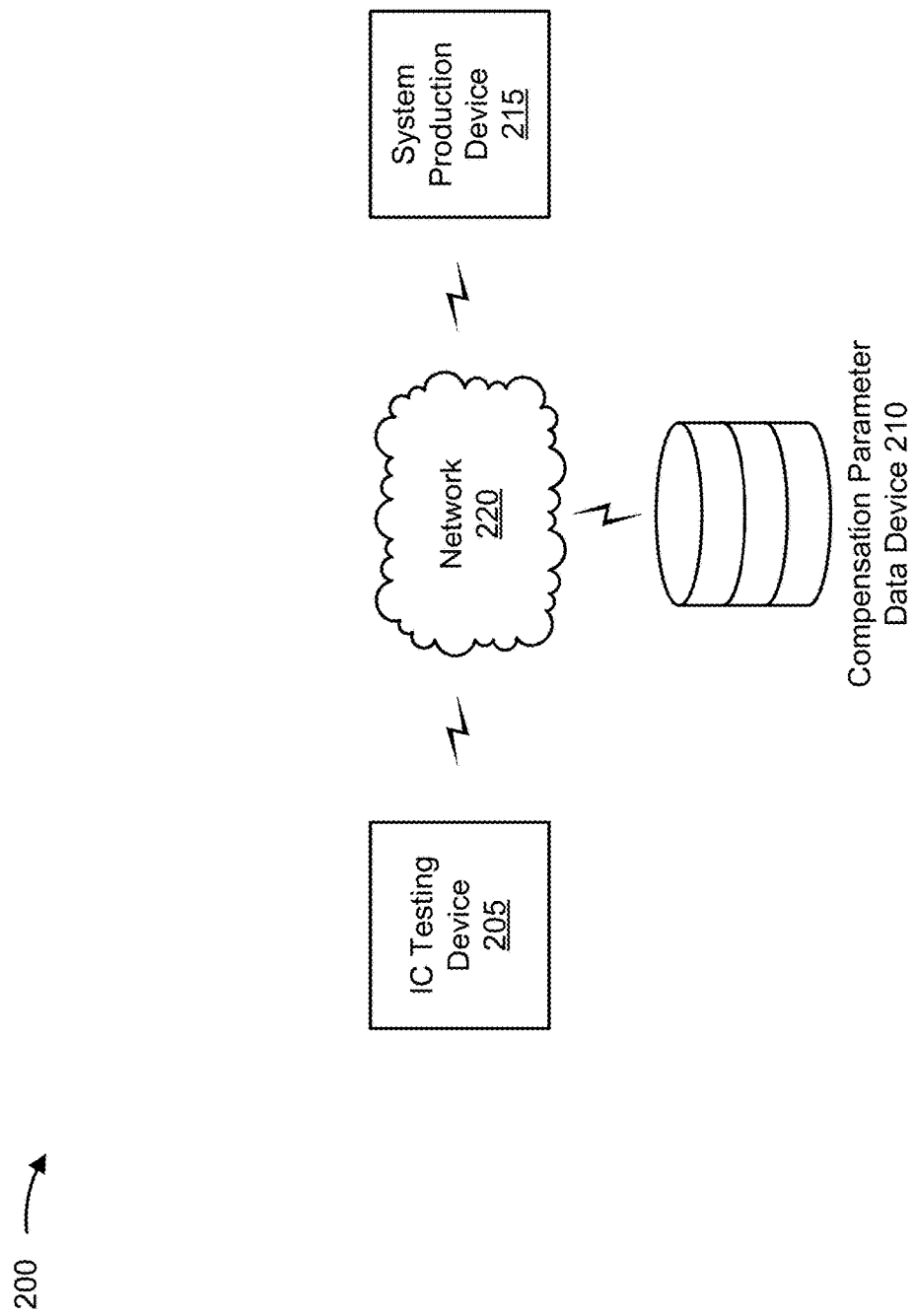
FIG. 2 is a diagram of an example environment in which techniques and/or methods, described herein, may be implemented.

FIG. 2 is a diagram of an example environment 200 in which techniques and/or methods, described herein, may be implemented. As shown in FIG. 2, environment 200 may include an IC testing device 205, a compensation parameter data device 210, a system production device 215, and a network 220. Devices of environment 200 may interconnect via wired connections, wireless connections, or a combination of wired and wireless connections.

IC testing device 205 includes one or more devices capable of determining, measuring, calculating, or otherwise obtaining compensation parameter information and/or other information (e.g., verification information, a value of a PUF parameter, and/or the like) associated with a sensor IC at production of the sensor IC, as described herein. For example, IC testing device 205 may include a testing device (e.g., a device capable of performing one or more tests on a sensor IC), a server or a group of servers, a user device (e.g., a tablet computer, a laptop computer, a desktop computer) and/or another type of communication and computing device. In some implementations, IC testing device 205 may be located at an IC production facility associated with producing the sensor ICs.

Compensation parameter data device 210 includes one or more devices capable of maintaining a compensation parameter data structure for storing compensation parameter information and/or other information associated with the sensor ICs, as described herein. For example, compensation parameter data device 210 may include a server or a group of servers and/or another type of communication and computing device. In some implementations, compensation parameter data device 210 may include one or more devices capable of performing operations associated with authenticating a sensor IC, as described herein. In some implementations, compensation parameter data device 210 is remotely located from an IC production facility, associated with producing sensor ICs, and/or a system production facility associated with producing sensor systems. For example, in some implementations, compensation parameter data device 210 may be (at least partially) included in a cloud computing environment.

System production device 215 includes one or more devices capable of obtaining compensation parameter information associated with a sensor IC and/or other information associated with the sensor IC, and causing a set of compensation parameters, associated with the compensation parameter information, to be stored on a controller of a sensor system including the sensor IC, as described herein. For example, system production device 215 may include a server or a group of servers, a user device (e.g., a tablet computer, a laptop computer, a desktop computer), and/or another type of communication and computing device. In some implementations, system production device 215 may be located at a system production facility associated with producing the sensor system.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Notably, while example environment 200 illustrates IC testing device 205, compensation parameter data device 210, and system production device 215 as being connected via a network, in some implementations, a channel via which the compensation parameter information is provided may take another form, such as database access, e-mail, fax, mail, physical memory device, written or printed medium, oral communication, and/or another type of information channel.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
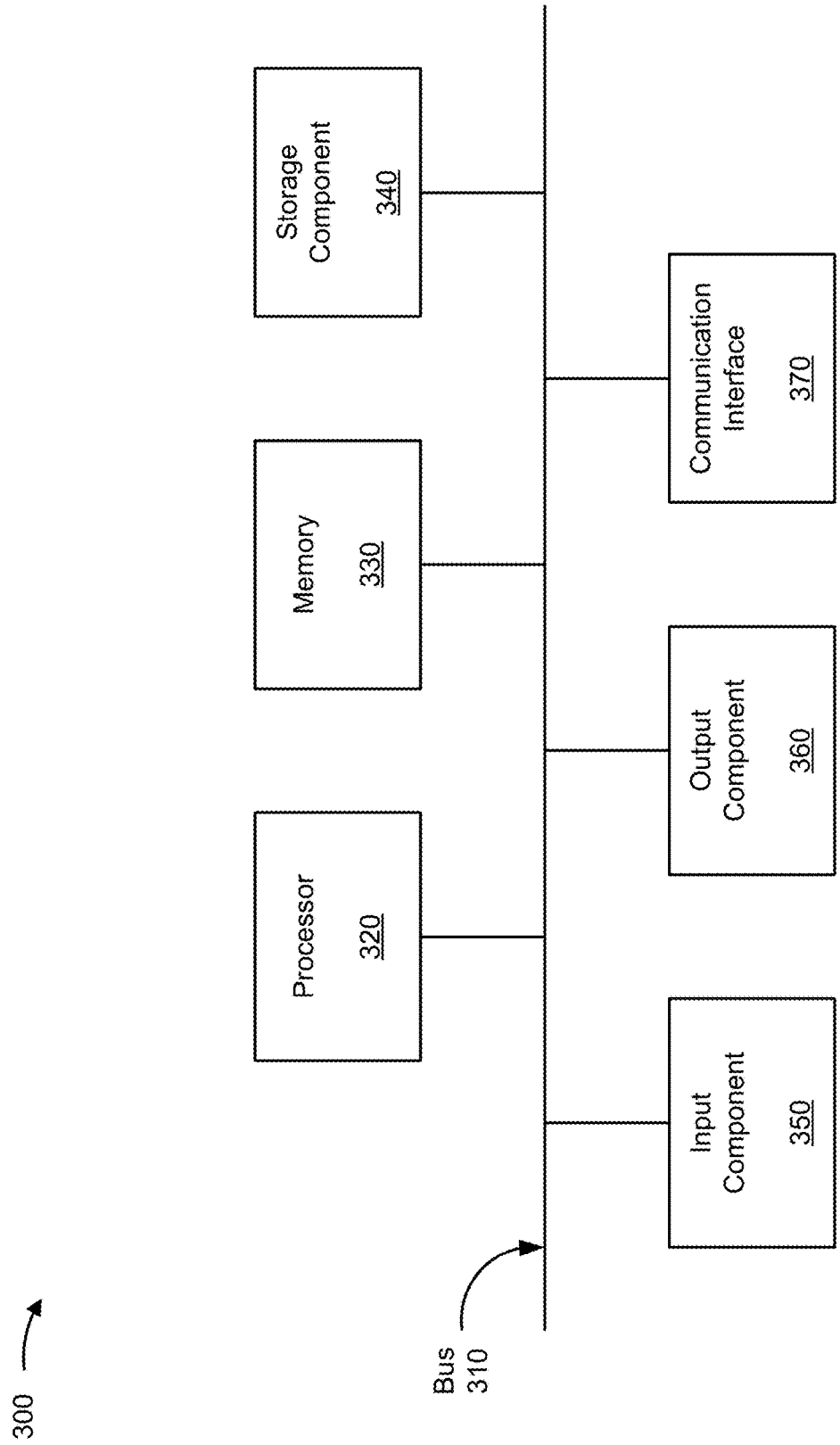
FIG. 3 is a diagram of example components of one or more devices of FIG. 2.

FIG. 3 is a diagram of example components of a device 300. Device 300 may correspond to IC testing device 205, compensation parameter data device 210, and/or system production device 215. In some implementations, IC testing device 205, compensation parameter data device 210, and/or system production device 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
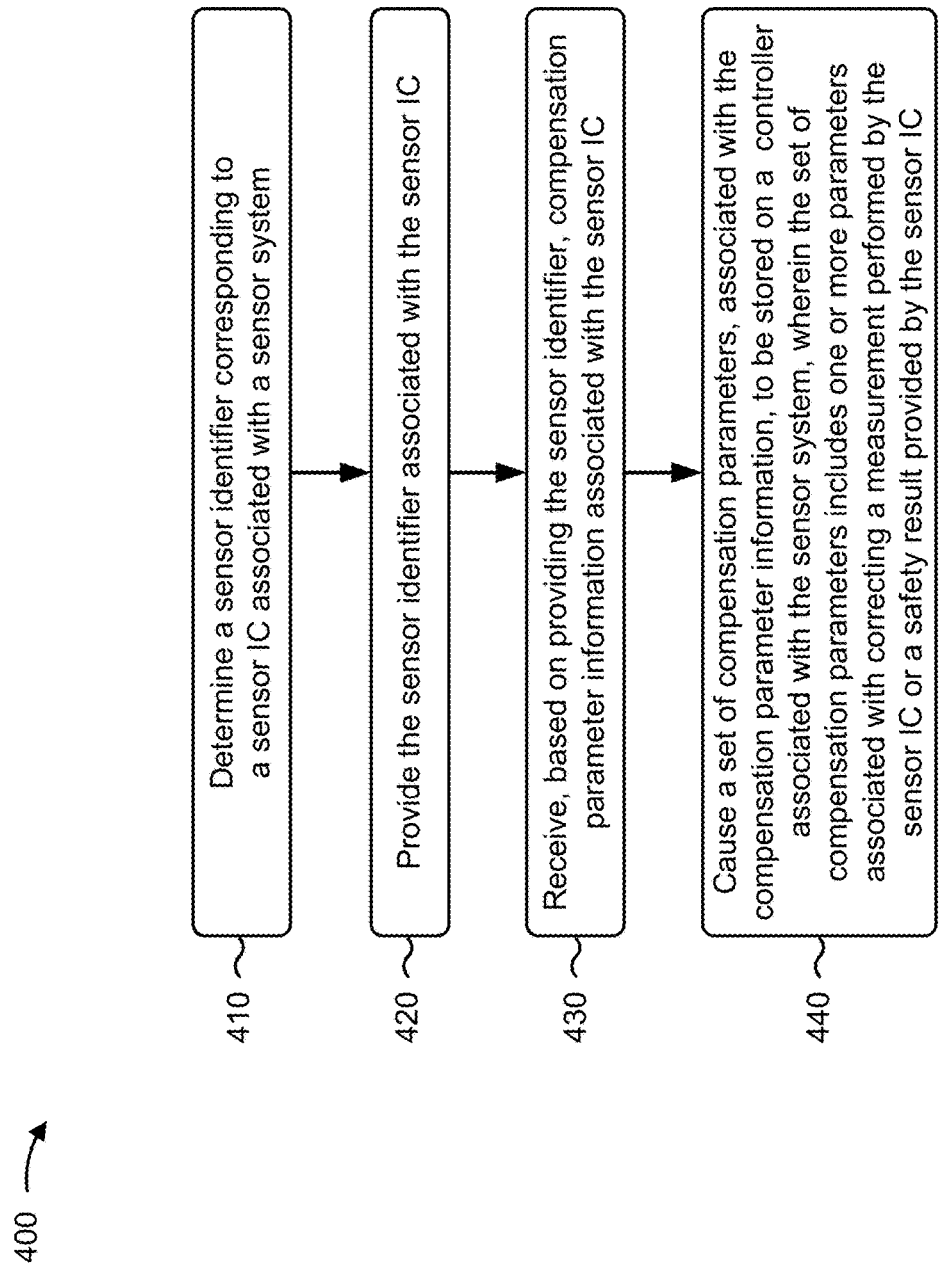
FIG. 4 is a flow chart of an example process for receiving, based on a sensor identifier associated with a sensor IC of a sensor system, compensation parameter information associated with a sensor IC, and causing a set of compensation parameters, associated with the sensor IC, to be stored on a controller of the sensor system.

FIG. 4 is a flow chart of an example process 400 for receiving, based on a sensor identifier associated with a sensor IC of a sensor system, compensation parameter information associated with a sensor IC, and causing a set of compensation parameters, associated with the sensor IC, to be stored on a controller of the sensor system. In some implementations, one or more process blocks of FIG. 4 may be performed by system production device 215. In some implementations, one or more process blocks of FIG. 4 may be performed by another device or a group of devices separate from or including system production device 215, such as compensation parameter data device 210.

As shown in FIG. 4, process 400 may include determining a sensor identifier corresponding to a sensor IC associated with a sensor system (block 410). For example, system production device 215 (e.g., using one or more components described with regard to FIG. 3) may determine a sensor identifier corresponding to a sensor IC (e.g., sensor IC 605) associated with sensor system (e.g., sensor system 680), as described above.

As further shown in FIG. 4, process 400 may include providing the sensor identifier associated with the sensor IC (block 420). For example, system production device 215 (e.g., using one or more components described with regard to FIG. 3) may provide the sensor identifier corresponding to the sensor IC, as described above.

As further shown in FIG. 4, process 400 may include receiving, based on providing the sensor identifier, compensation parameter information associated with the sensor IC (block 430). For example, system production device 215 (e.g., using one or more components described with regard to FIG. 3) may receive, based on providing the sensor identifier, compensation parameter information associated with the sensor IC, as described above.

As further shown in FIG. 4, process 400 may include causing a set of compensation parameters, associated with the compensation parameter information, to be stored on a controller associated with the sensor system, wherein the set of compensation parameters includes one or more parameters associated with correcting a measurement performed by the sensor IC or a safety result provided by the sensor IC (block 440). For example, system production device 215 (e.g., using one or more components described with regard to FIG. 3) may cause a set of compensation parameters, associated with the compensation parameter information, to be stored on a controller (e.g., controller 650 as explained with regards to FIG. 6B further down) associated with the sensor system, wherein the set of compensation parameters includes one or more parameters associated with correcting a measurement performed by the sensor IC or a safety result provided by the sensor IC, as described above.

Process 400 may include additional implementations, such as any single implementation or any combination of implementations described below and/or in connection with one or more other processes described elsewhere herein.

In some implementations, the compensation parameter information includes compensation data associated with the sensor IC, and system production device 215 may calculate the set of compensation parameters based on the compensation data and a compensation parameter algorithm. In some implementations, the compensation parameter information includes the set of compensation parameters.

In some implementations, the compensation parameter information includes compensation parameter information that is unique to the sensor IC. In some implementations, the compensation parameter information includes global compensation parameter information that is associated with a plurality of sensor ICs.

In some implementations, system production device may determine first verification information associated with the sensor IC, may compute second verification information based on the compensation parameter information, and may determine whether the second verification information matches the first verification information. Based on the determination, system production device 215 may either verify that the compensation parameter information corresponds to the sensor IC (e.g., when the second verification information matches the first verification information), or may determine that the compensation parameter information does not correspond to the sensor IC (e.g., when the second verification information does not match the first verification information). Put another way, system production device 215 may determine first verification information associated with the IC, compute second verification information based on the compensation parameter information, and selectively verify that the compensation parameter information corresponds to the sensor IC based on whether the second verification information matches the first verification information.

In some implementations, the compensation parameter information includes a first value of a physical unclonable function (PUF) parameter associated with the sensor IC. Here, system production device 215 may measure a second value of the PUF parameter associated with the sensor IC, and determine whether the second value of the PUF parameter matches the first value of the PUF parameter. Based on the determination, system production device 215 may either authenticate the sensor IC (e.g., when the second value of the PUF parameter matches the first value of the PUF parameter) or determine that the sensor IC is not authentic (e.g., when the second value of the PUF parameter does not match the first value of the PUF parameter). Put another way, system production device 215 may measure a second value of the PUF parameter associated with the sensor IC, and selectively authenticate the sensor IC based on whether the second value of the PUF parameter matches the first value of the PUF parameter.

In some implementations, system production device 215 may measure a value of a physical unclonable (PUF) parameter associated with the sensor IC, may transmit an authentication request including the sensor identifier and information that identifies the value of the PUF parameter associated with the sensor IC, and may receive an authentication response indicating whether the sensor IC is authentic.

In some implementations, the compensation parameter information is received from a compensation parameter data structure (e.g., hosted, maintained, managed, and/or the like, by compensation parameter data device 210) that stores compensation parameter information associated with a plurality of sensor ICs. In some implementations, the sensor identifier is determined based on being stored on memory component (e.g., memory component 615) of the sensor IC.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
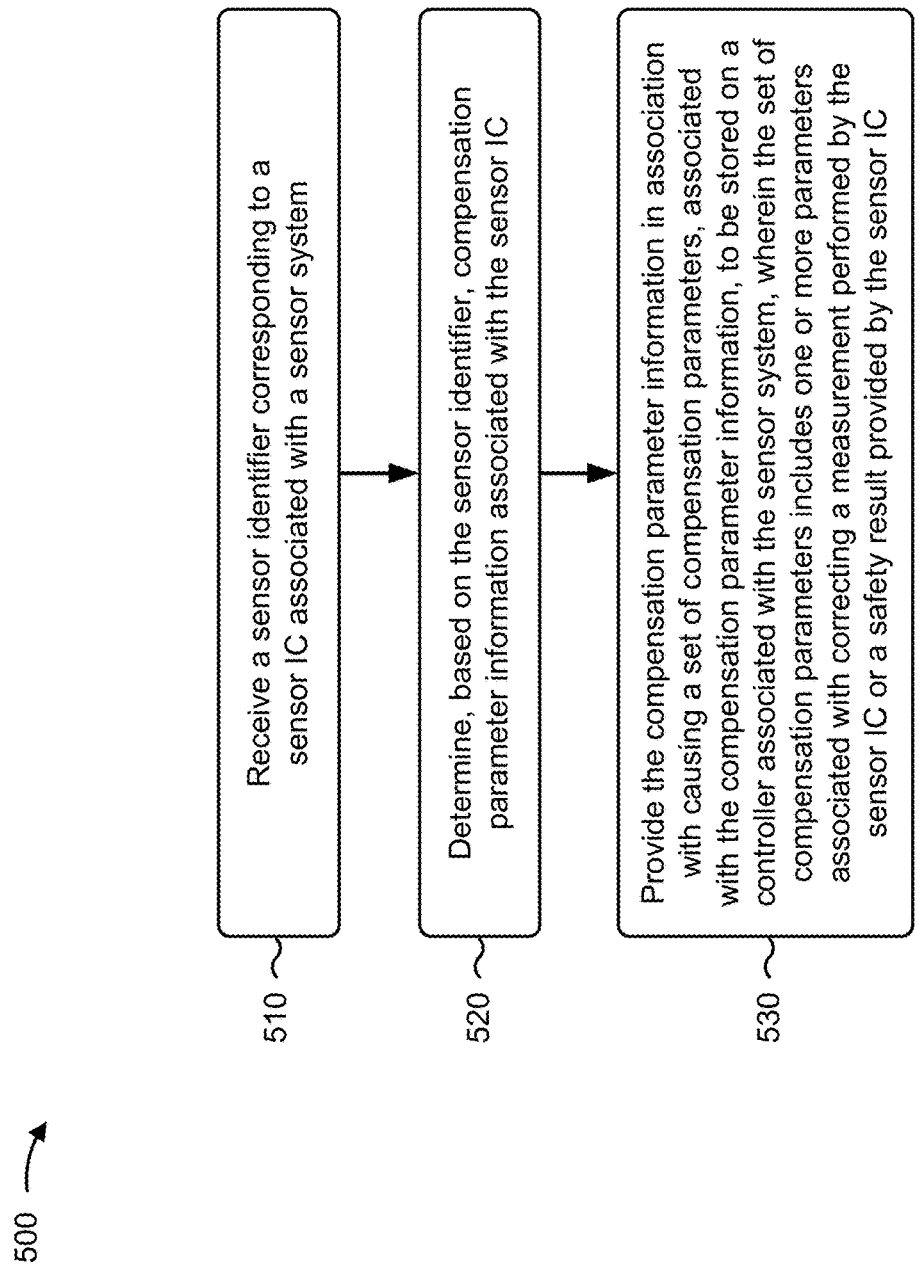
FIG. 5 is a flow chart of an example process for providing, based on a sensor identifier corresponding to a sensor IC, compensation parameter information associated with the sensor IC.

FIG. 5 is a flow chart of an example process 500 for providing, based on a sensor identifier corresponding to a sensor IC, compensation parameter information associated with the sensor IC. In some implementations, one or more process blocks of FIG. 5 may be performed by compensation parameter data device 210. In some implementations, one or more process blocks of FIG. 5 may be performed by another device or a group of devices separate from or including compensation parameter data device 210, such as system production device 215 or IC testing device 205.

As shown in FIG. 5, process 500 may include receiving a sensor identifier corresponding to a sensor IC associated with a sensor system (block 510). For example, compensation parameter data device 210 (e.g., using one or more components described with regard to FIG. 3) may receive a sensor identifier corresponding to a sensor IC (e.g., sensor IC 605) associated with a sensor system, as described above.

As further shown in FIG. 5, process 500 may include determining, based on the sensor identifier, compensation parameter information associated with the sensor IC (block 520). For example, compensation parameter data device 210 (e.g., using one or more components described with regard to FIG. 3) may determine, based on the sensor identifier, compensation parameter information associated with the sensor IC, as described above.

As further shown in FIG. 5, process 500 may include providing the compensation parameter information in association with causing a set of compensation parameters, associated with the compensation parameter information, to be stored on a controller associated with the sensor system, wherein the set of compensation parameters includes one or more parameters associated with correcting a measurement performed by the sensor IC or a safety result provided by the sensor IC (block 530). For example, compensation parameter data device 210 (e.g., using one or more components described with regard to FIG. 3) may provide the compensation parameter information in association with causing a set of compensation parameters, associated with the compensation parameter information, to be stored on a controller (e.g., controller 650 of FIG. 6B) associated with a sensor system (e.g., sensor system 680 as disclosed with regards to FIG. 6C), wherein the set of compensation parameters includes one or more parameters associated with correcting a measurement performed by the sensor IC or a safety result provided by the sensor IC, as described above.

Process 500 may include additional implementations, such as any single implementation or any combination of implementations described below and/or in connection with one or more other processes described elsewhere herein.

In some implementations, compensation parameter data device 210 may determine, based on the sensor identifier, verification information associated with verifying that the compensation parameter information corresponds to the sensor IC, and may provide the verification information.

In some implementations, compensation parameter data device 210 may determine, based on the sensor identifier, a value of a physical unclonable function (PUF) parameter associated with authenticating the sensor IC, and may provide the value of the PUF parameter.

In some implementations, compensation parameter data device 210 may measure a first value of a physical unclonable function (PUF) parameter associated with the sensor IC, and may receive an authentication request including the sensor identifier and information that identifies a second value of the PUF parameter associated with the sensor IC. Here, compensation parameter data device 210 may determine whether the second value of the PUF parameter matches the first value of the PUF parameter, may determine whether the sensor IC is authentic based on whether the second value of the PUF matches the first value of the PUF, and may transmit an authentication response indicating whether the sensor IC is authentic.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
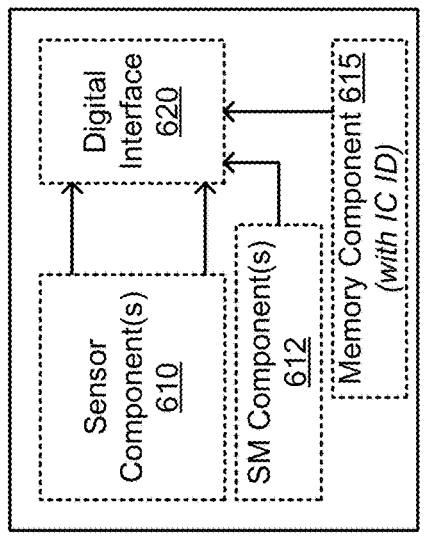
FIGS. 6A-6C are diagrams of example components of a sensor IC, a controller, and a sensor system that includes one or more sensor ICs and a controller, as described herein.
Figure 6B:
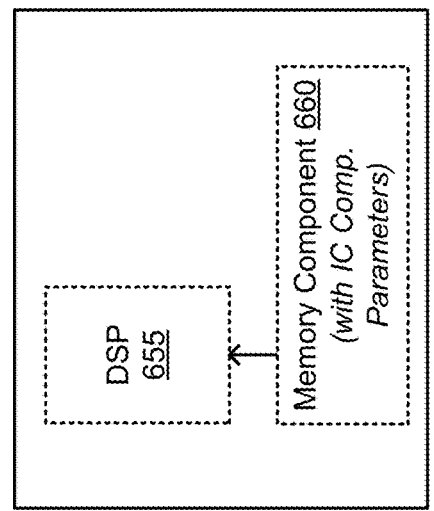
Figure 6C:
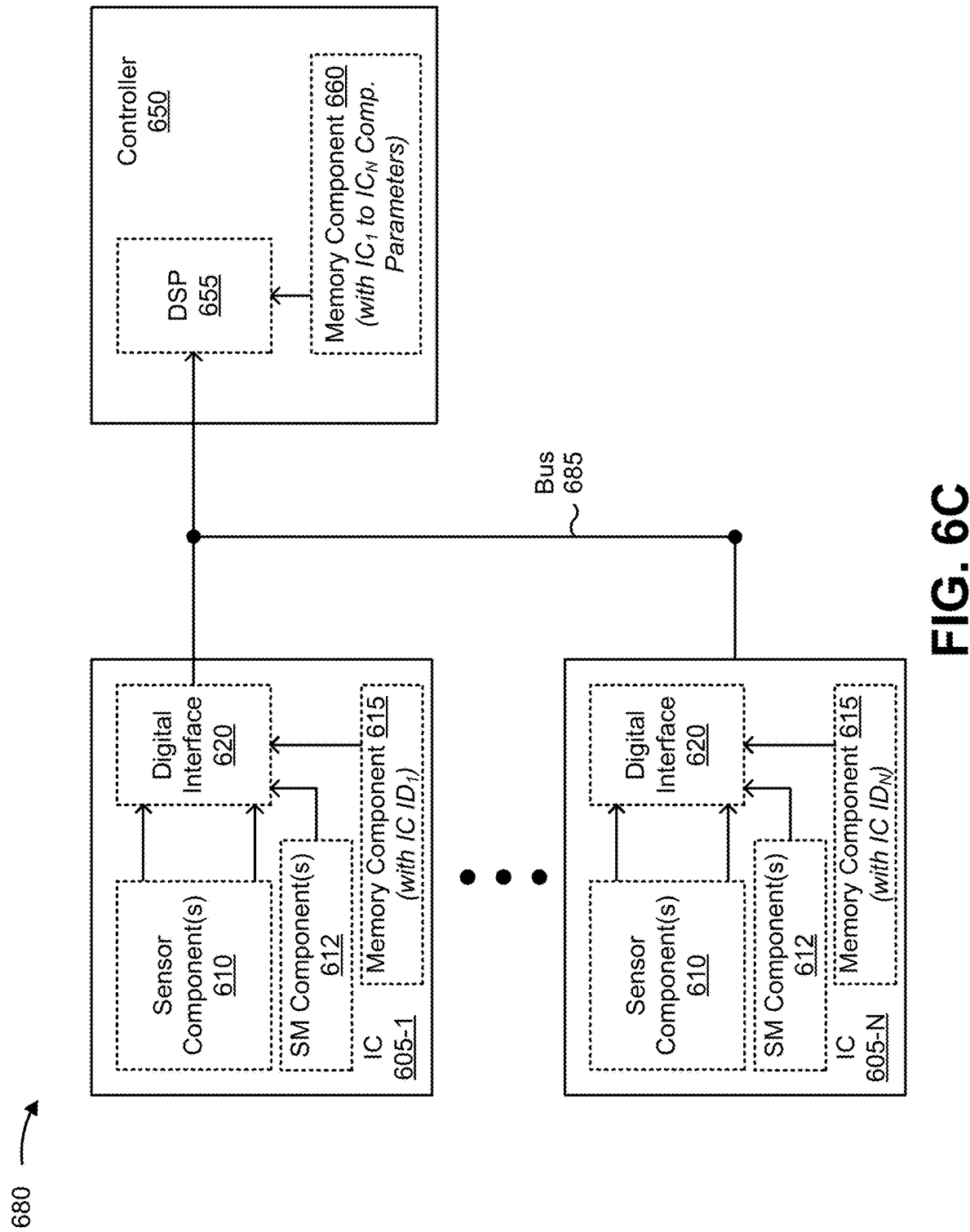

FIGS. 6A-6C are diagrams of example components of a sensor IC, a controller, and a sensor system that includes one or more sensor ICs and a controller, as described herein. FIG. 6A is a diagram of example components of a sensor IC 605.

As shown in FIG. 6A, sensor IC 605 may include one or more sensor component 610, one or more SM components 612, a memory component 615, and a digital interface 620.

Sensor component 610 includes one or more components capable of providing a sensing functionality (e.g., measuring a physical property and providing an output corresponding to a value of the measurement). For example, sensor component 610 may include one or more components that form a magnetic sensor (e.g., Hall-based sensor, a magnetoresistive (MR) based sensor, a variable reluctance (VR) based sensor), a temperature sensor, a pressure sensor, an acceleration sensor, a stress sensor, a voltage sensor (e.g., a supply voltage sensor), a current sensor, a humidity sensor, a gas sensor, a light sensor, and/or another type of sensor. In some implementations, as shown in FIG. 6A, sensor IC 605 may include multiple sensor components 610 (e.g., two or more sensor components 610). For example, sensor IC 605 may include a first sensor component 610 that is a magnetic sensor, a second sensor component 610 that is a temperature sensor, and so forth. In some implementations, sensor IC 605 and/or a given sensor component 610 may include an analog-to-digital converter (ADC) that converts an analog signal to a digital signal (e.g., such that an analog signal can be converted into a digital signal to be provided via digital interface 620).

SM component 612 includes one or more components capable of providing a safety functionality (e.g., measuring, calculating, obtaining, or otherwise determining a safety result associated with a safety mechanism implemented by SM component 612). In some implementations, SM component 612 may include one or more sensor components (e.g., one or more sensor components 610) associated with providing the safety functionality. In some implementations, as shown in FIG. 6A, sensor IC 605 may include multiple SM components 612 (e.g., two or more SM components 612). In some implementations, sensor IC 605 and/or a given SM component 612 may include an ADC that converts an analog signal to a digital signal (e.g., such that an analog signal can be converted into a digital signal to be provided via digital interface 620).

Memory component 615 may include a read only memory (ROM) (e.g., an EEPROM), a random access memory (RAM), and/or another type of dynamic or static storage device (e.g., a flash memory, a magnetic memory, an optical memory, etc.) that stores information and/or instructions associated with one or more components of sensor IC 605. For example, in some implementations, memory component 615 may store information and/or instructions associated with operations performed by sensor component 610 and/or SM component 612. As further shown, memory component 615 stores a sensor identifier associated with sensor IC 605. As described above, memory component 615 may not need to store compensation parameter information and/or a set of compensation parameters associated with sensor IC 605, thereby allowing sensor IC 605 to have a reduced cost, size, and complexity (e.g., as compared to a sensor IC with a comparatively larger memory component needed to store the compensation parameter information and/or the set of compensation parameters). Depending on circumstances it may however be of advantage to store compensation parameter information and/or a set of compensation parameters associated with sensor IC 605 in the memory component 615. Providing compensation parameter within sensor IC 605 may reduce latency times required for requesting these parameters from another entity.

Digital interface 620 may include an interface via which sensor IC 605 may receive and/or provide information from and/or to another device, such as controller 650. For example, digital interface 620 may provide an output signal of sensor component 610, an output signal of SM component 612, and/or information stored by memory component 615 (e.g., the sensor identifier, verification information associated with verifying compensation parameter information, and/or the like), to controller 650. In some implementations, sensor IC 605 may receive information from controller 650 via digital interface 620.

Notably, since sensor IC 605 need not perform operations associated with correcting a measurement by sensor component 610 or operations associated with correcting a safety result provided by SM component 612, sensor IC 605 does not include a processing unit, thereby reducing a cost, size, and complexity of sensor IC 605 (e.g., as compared to a sensor IC that includes a processing unit).

FIG. 6B is a diagram of example components of a controller 650. As shown in FIG. 6B, controller 650 may include a DSP 655 and a memory component 660. DSP 655 may include a digital signal processing device or a collection of digital signal processing devices, such as one or more DSPs, one or more ALUs, one or more microcontrollers (Cs), and/or the like. In some implementations, DSP 655 may be configured to receive, from one or more sensor ICs 605, digital signals representing measurements performed by the one or more sensor ICs 605 or safety results determined by the one or more sensor ICs 605. In some implementations, DSP 655 may perform operations associated with correcting the measurements and/or the safety results based on respective sets of compensation parameters, associated with the one or more sensor ICs 605, that are stored on memory component 660. In some implementations, DSP 655 may be configured to output a signal representing the corrected measurements and/or the corrected safety results (e.g., signals associated with controlling one or more electrical systems).

Memory component 660 may include a ROM (e.g., an EEPROM), a RAM, and/or another type of dynamic or static storage device that stores information and/or instructions for controller 650. In some implementations, memory component 660 may store information associated with operations performed by DSP 655. As further shown, memory component 660 may store one or more sets of compensation parameters associated with one or more respective sensor ICs 605. In some implementations, memory component 660 may store an association between each of the sets of compensation parameters and a corresponding sensor identifier.

FIG. 6C is a diagram of an example sensor system 680 including one or more sensor ICs 605 and a controller 650. As shown in FIG. 6C, sensor system 680 may include one or more sensor ICs 605 (e.g., sensor IC 605-1 through sensor IC 605-N (N≥1) connected to controller 650. As shown, in some implementations, the one or more sensor ICs 605 may connect to controller 650 via a bus 685.

In some implementations, sensor ICs 605 of sensor system 680 may include different types of sensor components 610 and/or SM components 612, different numbers of sensor components 610 and/or SM components 612, different arrangements of components, and/or the like. As shown in FIG. 6C, respective memory components 615 of each sensor IC 605 store an associated sensor identifier (e.g., sensor IC 605-1 stores a first sensor identifier, sensor IC 605-N stores an Nth sensor identifier), while memory component 660 of controller 650 stores sets of compensation parameters associated with each of the one or more sensor ICs 605 (e.g., memory component 660 stores a set of compensation parameters corresponding to sensor IC 605-1 and a set of compensation parameters corresponding to sensor IC 605-N). In some implementations, the sets of compensation parameters can be stored on memory component 660 during production of sensor system 680, as described above in association with FIGS. 1A-1C.

The number and arrangement of components shown in FIGS. 6A-6C are provided as example. In practice, sensor IC 605, controller 650, and/or sensor system 680 may include additional components, fewer components, different components, or differently arranged components than those shown in FIGS. 6A-6C. Additionally, or alternatively, a set of components (e.g., one or more components) of sensor IC 605, controller 650, and/or sensor system 680 may perform one or more functions described as being performed by another set of components of sensor IC 605, controller 650, and/or sensor system 680.

In some implementations, a given sensor IC 605 can measure one or more signals of interest, one or more of which can be used to compensate their mutual cross-dependencies. Thus, in some implementations, a given signal of interest may actually be used to compensate a cross-dependency on another signal of interest. For example, assume that sensor IC 605 is designed to measure pressure, acceleration, stress, temperature, and supply voltage. Here, stress, temperature, and supply voltage, as measured by sensor IC 605, could be used to compensate an acceleration measurement, while stress, temperature, supply voltage, and acceleration, as measured by sensor IC 605, could be used to compensate the pressure measurement. As another example, assume that sensor IC 605 is designed to measure (one or more components of) a magnetic field, stress, temperature, and supply voltage. Here, supply voltage, temperature, and stress, as measured by sensor IC 605, could be used to compensate the magnetic field measurement. In some implementations, such a technique may be implemented when sensor IC 605 stores a sensor identifier and provides information associated with the sensor identifier and one or more raw measurements obtained by one or more respective sensor components 610. Here, controller 650 which stores a set of compensation parameters associated with sensor IC 605, may receive the sensor identifier, determine the set of stored compensation parameters, and perform measurement compensation of the one or more raw measurements based on the set of compensation parameters. As an alternative, such a technique can be implemented when a sensor IC 605 stores the set of compensation parameters (rather than a sensor identifier) and provides information associated with the set of compensation parameters and one or more raw measurements obtained by one or more respective sensor components 610. Here, controller 650, may receive the information associated with the set of compensation parameters and perform measurement compensation of the one or more raw measurements based on the set of compensation parameters.

Figure 7:
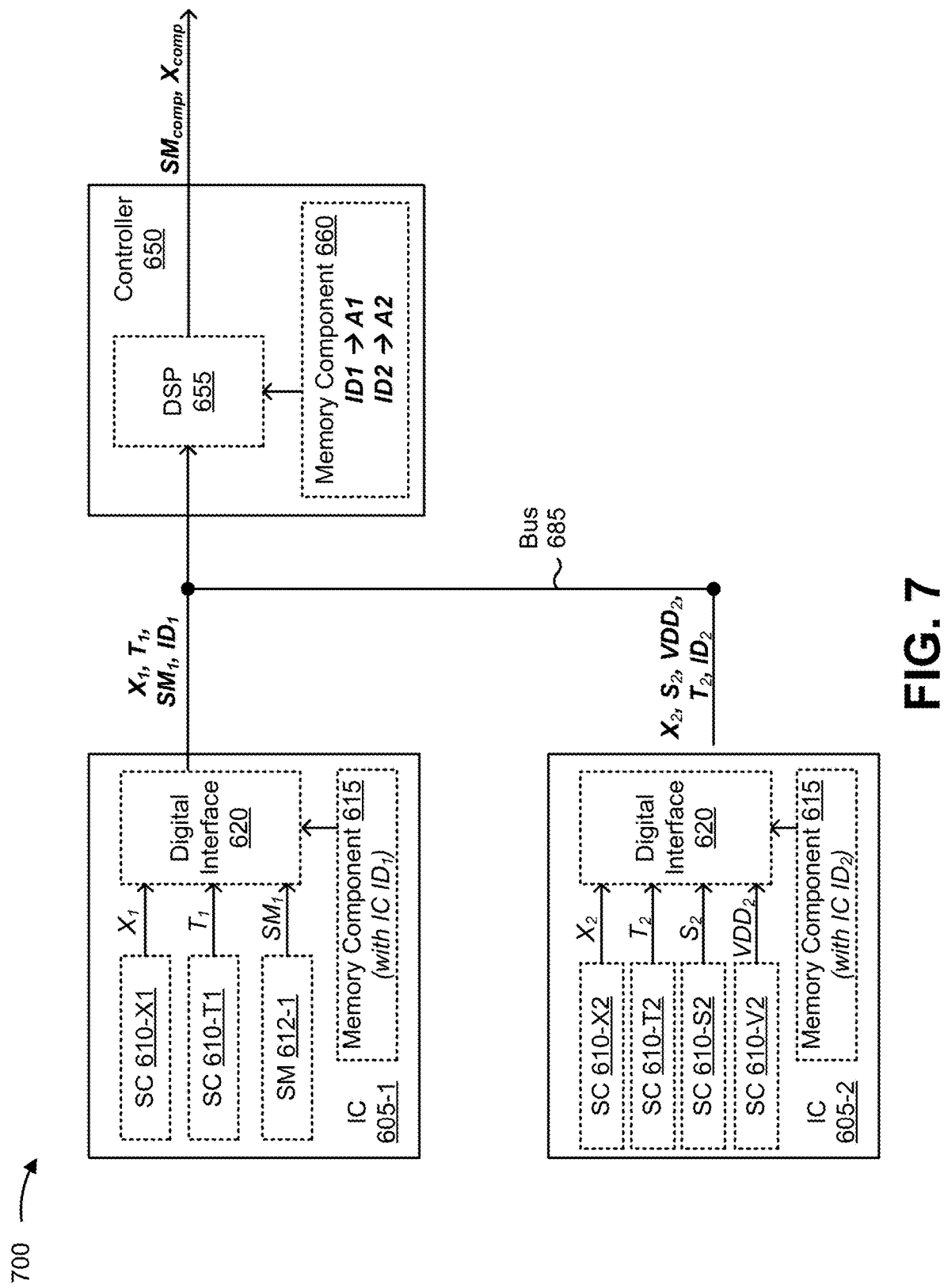
FIG. 7 is a diagram an illustrating example implementation of a sensor system of FIG. 6C.

FIG. 7 is a diagram illustrating example implementation of sensor system 680. The example sensor system 680 of FIG. 7 is herein referred to as sensor system 700. As shown in FIG. 7, sensor system 700 includes sensor IC 605-1 and sensor IC 605-2, which are connected to controller 650 via bus 685.

As shown, sensor IC 605-1 includes sensor component 610-X1, which is configured to measure a magnetic field strength at sensor IC 605-1, a sensor component 610-T1, which is configured to measure a temperature at sensor IC 605-1, and a SM component 612-1, which is configured to provide a safety result associated with assessing functional safety of sensor IC 605-1. As further shown, memory component 615 of sensor IC 605-1 stores a sensor identifier of sensor IC 605-1 (e.g., $ID_1$).

As further shown, sensor IC 605-2 includes sensor component 610-X2, which is configured to measure a magnetic field strength at sensor IC 605-2, and a sensor component 610-T2, which is configured to measure a temperature at sensor IC 605-2. Sensor IC 605-2 further includes sensor component 610-S2, which is configured to measure a stress at sensor IC 605-2, and a sensor component 610-V2, which is configured to measure a supply voltage at sensor IC 605-2. As further shown, memory component 615 of sensor IC 605-2 stores a sensor identifier of sensor IC 605-2 (e.g., $ID_2$).

As further shown in FIG. 7, memory component 660 of controller 650 stores a set of compensation parameters associated with sensor IC 605-1 (e.g., $A_1$) and information association this set of compensation parameters to the sensor identifier $ID_1$. Similarly, memory component 660 of controller 650 stores a set of compensation parameters associated with sensor IC 605-2 (e.g., $A_2$) and information association this set of compensation parameters to the sensor identifier $ID_2$.

In an example operation, sensor IC 605-1 provides, to controller 650, a signal $X_1$ representing a magnetic field measurement performed by sensor component 610-X1, a signal $T_1$ representing a temperature measurement performed by sensor component 610-T1, and a signal $SM_1$ representing a safety result as determined by SM component 612-1. As further shown, sensor IC 605-1 also provides information that identifies the sensor identifier $ID_1$. Similarly, sensor IC 605-2 provides, to controller 650, a signal $X_2$ representing a magnetic field measurement performed by sensor component 610-X2, a signal $T_2$ representing a temperature measurement performed by sensor component 610-T2, a signal $S_2$ representing a stress measurement performed by sensor component 610-S2, and a signal $VDD_2$ representing a supply voltage measurement performed by sensor component 610-V2. As further shown, sensor IC 605-2 also provides information that identifies the sensor identifier $ID_2$.

In this example, controller 650 (e.g., DSP 655) receives the signals and sensor identifiers provided by sensor IC 605-1 and sensor IC 605-2 and performs (e.g., based on the various signals and a measurement compensation algorithm stored on memory component 660) measurement compensation in order to generate an output signal (e.g., $X_{comp}$) that represents a compensated magnetic field measurement, and an output signal (e.g., $SM_{comp}$) that represents a compensated safety result.

As indicated above, FIG. 7 is provided merely as an example. Other examples are possible and may differ from what was described with regard to FIG. 7. For example, sensor system 680 may include a different number of sensor ICs 605, different sensor ICs 605, differently arranged sensor ICs 605, differently connected sensor ICs 605, and/or the like, than shown in example implementation 700.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    determining, by a device, a first sensor identifier corresponding to a sensor integrated circuit (IC) associated with a sensor system,
        wherein the sensor IC is produced at an IC production facility, and
        wherein the sensor system is produced at a system production facility;
    obtaining, by the device and based on the first sensor identifier, a signal representing raw compensation data, of first one or more compensation parameters associated with the sensor IC, during testing of the sensor IC;
    obtaining, by the device and from the IC production facility, the first one or more compensation parameters determined by an IC testing device associated with the IC production facility,
    wherein first verification information is determined based on the first one or more compensation parameters;
    receiving, by the device, from the IC production facility, and via a first information channel, a first physical unclonable function (PUF) value of a PUF parameter associated with the sensor IC,
        wherein the first PUF value is associated with a first output generated by the sensor IC based on a specific condition during the production of the sensor IC, and
        wherein the first information channel is separate from a second channel via which the sensor IC is provided from the IC production facility to the system production facility;
    storing, by the device, the received first PUF value;
    receiving, by the device, from the system production facility, and via a second information channel, a second PUF value of the PUF parameter associated with a second output generated by the sensor IC based on the specific condition during production of the sensor system,
        wherein the sensor system includes the sensor IC;
    storing, by the device, the received second PUF value;
    authenticating, by the device and based on comparing the first PUF value and the second PUF value, the sensor IC;
    receiving, by the device and from the system production facility, a second sensor identifier determined by a system production device associated with the system production facility;
    determining, by the device and based on the received second sensor identifier, second one or more compensation parameters;
    providing, by the device and to the system production facility, the determined second one or more compensation parameters,
        wherein second verification information is determined based on the second one or more compensation parameters, and
        wherein the first verification information and the second verification information are compared for verification; and
    storing, by the device, based on the verification, and based on authenticating the sensor IC, compensation parameter information, associated with the second one or more compensation parameters and including at least the raw compensation data and the PUF parameter, on a controller of the sensor system,
        wherein the determining the first sensor identifier, and the determining the signal representing the raw compensation data occur during the production of the sensor IC,
        wherein the authenticating the sensor IC, and the storing the compensation parameter information occur during the production of the sensor system, and
        wherein the compensation parameter information and the second sensor identifier are used to correct a measurement, performed by the sensor IC, during use of the sensor system.

2. The method of claim 1, wherein the first one or more compensation parameters are based on the compensation parameter information, and wherein the compensation parameter information is unique to the sensor IC.

3. The method of claim 1, wherein the first one or more compensation parameters are based on global compensation parameter information that is associated with a plurality of sensor ICs including the sensor IC.

4. The method of claim 1, wherein the first one or more compensation parameters are based on additional compensation parameter information received from a compensation parameter data structure that stores the compensation parameter information associated with a plurality of sensor ICs including the sensor IC.

5. The method of claim 1, wherein the first value of the PUF parameter includes a value representing an output provided by the sensor IC under a specific condition during the testing of the sensor IC.

6. The method of claim 1, wherein a sensor of the sensor IC is one or more of a magnetic sensor, a temperature sensor, a pressure sensor, an acceleration sensor, a stress sensor, a voltage sensor, or a current sensor.

7. The method of claim 1, wherein the compensation parameter information includes at least one of:
    information associated with correcting the measurement, or
    information associated with a safety result related to the sensor IC.

8. A non-transitory computer-readable medium storing a set of instructions, the set of instructions comprising: compensation parameter one or more instructions that, when executed by one or more processors of a device, cause the device to:
determine a first sensor identifier corresponding to a sensor integrated circuit (IC) associated with a sensor system,
wherein the sensor IC is produced at an IC production facility, and
wherein the sensor system is produced at a system production facility;
obtain, based on the first sensor identifier, a signal representing raw compensation data, of first one or more compensation parameters associated with the sensor IC, during testing of the sensor IC;
obtain, from the IC production facility, the first one or more compensation parameters determined by an IC testing device associated with the IC production facility,
wherein first verification information is determined based on the first one or more compensation parameters;
receive, from the IC production facility, and via a first information channel, a first physical unclonable function (PUF) value of a PUF parameter associated with the sensor IC,
wherein the first PUF value is associated with a first output generated by the sensor IC based on a specific condition during the production of the sensor IC, and
wherein the first information channel is separate from a second channel via which the sensor IC is provided from the IC production facility to the system production facility;
store the received first PUF value;
receive, from the system production facility, and via a second information channel, a second PUF value of the PUF parameter associated with a second output generated by the sensor IC based on the specific condition during production of the sensor system,
wherein the sensor system includes the sensor IC;
store the received second PUF value;
authenticate, based on comparing the first PUF value and the second PUF value, the sensor IC;
receive, from the system production facility, a second sensor identifier determined by a system production device associated with the system production facility;
determine, based on the received second sensor identifier, second one or more compensation parameters;
provide, to the system production facility, the determined second one or more compensation parameters,
wherein second verification information is determined based on the second one or more compensation parameters, and
wherein the first verification information and the second verification information are compared for verification; and
store, based on the verification, and based on authenticating the sensor IC, compensation parameter information, associated with the second one or more compensation parameters and including at least the raw compensation data and the PUF parameter, on a controller of the sensor system,
wherein the determining the first sensor identifier, and the determining the signal representing the raw compensation data occur during the production of the sensor IC,
wherein the authenticating the sensor IC, and the storing the compensation parameter information occur during the production of the sensor system, and
wherein the compensation parameter information and the second sensor identifier are used to correct a measurement, performed by the sensor IC, during use of the sensor system.

9. The non-transitory computer-readable medium of claim 8, wherein the first one or more compensation parameters are based on compensation parameter information, and wherein the compensation parameter information is unique to the sensor IC.

10. The non-transitory computer-readable medium of claim 8, wherein the first one or more compensation parameters are based on global compensation parameter information that is associated with a plurality of sensor ICs including the sensor IC.

11. The non-transitory computer-readable medium of claim 8, wherein the first value of the PUF parameter includes a value representing an output provided by the sensor IC under a specific condition during the testing of the sensor IC.

12. The non-transitory computer-readable medium of claim 8, wherein a sensor of the sensor IC is one or more of a magnetic sensor, a temperature sensor, a pressure sensor, an acceleration sensor, a stress sensor, a voltage sensor, or a current sensor.

13. The non-transitory computer-readable medium of claim 8, wherein the compensation parameter information includes at least one of:
information associated with correcting the measurement, or
information associated with a safety result related to the sensor IC.

14. The non-transitory computer-readable medium of claim 8, wherein the first verification information is determined based on the first one or more compensation parameters.

15. A device, comprising:
one or more processors to:
determine a first sensor identifier that identifies a sensor integrated circuit (IC) associated with a sensor system,
wherein the sensor IC is produced at an IC production facility, and
wherein the sensor system is produced at a system production facility;
obtain, based on the first sensor identifier, a signal representing raw compensation data, of first one or more compensation parameters associated with the sensor IC, during testing of the sensor IC;
obtain, from the IC production facility, the first one or more compensation parameters determined by an IC testing device associated with the IC production facility,
wherein first verification information is determined based on the first one or more compensation parameters;
receive, from the IC production facility, and via a first information channel, a first physical unclonable function (PUF) value of a PUF parameter associated with the sensor IC,
wherein the first PUF value is associated with a first output generated by the sensor IC based on a specific condition during the production of the sensor IC, and wherein the first information channel is separate from a second channel via which the sensor IC is provided from the IC production facility to the system production facility;

store the received first PUF value;

receive, from the system production facility, and via a second information channel, a second PUF value of the PUF parameter associated with a second output generated by the sensor IC based on the specific condition during production of the sensor system, wherein the sensor system includes the sensor IC;

store the received second PUF value;

authenticate, based on comparing the first PUF value and the second PUF value, the sensor IC;

receive, from the system production facility, a second sensor identifier determined by a system production device associated with the system production facility;

determine, based on the received second sensor identifier, second one or more compensation parameters;

provide, to the system production facility, the determined second one or more compensation parameters, wherein second verification information is determined based on the second one or more compensation parameters, and wherein the first verification information and the second verification information are compared for verification; and store, based on the verification, and based on authenticating the sensor IC, compensation parameter information, associated with second one or more compensation parameters and including at least the raw compensation data and the PUF parameter, on a controller of the sensor system, wherein the determining the first sensor identifier, and the determining the signal representing the raw compensation data occur during the production of the sensor IC, wherein the authenticating the sensor IC, and the storing the compensation parameter information occur during the production of the sensor system, and wherein the compensation parameter information and the second sensor identifier are used to correct a measurement, performed by the sensor IC, during use of the sensor system.

16. The device of claim 15, wherein the compensation parameter information is unique to the sensor IC.

17. The device of claim 15, wherein the first value of the PUF parameter includes a value representing an output provided by the sensor IC under a specific condition during the testing of the sensor IC.

18. The device of claim 15, wherein a sensor of the sensor IC is one or more of a magnetic sensor, a temperature sensor, a pressure sensor, an acceleration sensor, a stress sensor, a voltage sensor, or a current sensor.

19. The device of claim 15, wherein the compensation parameter information includes at least one of:
information associated with correcting the measurement, or
information associated with a safety result related to the sensor IC.

20. The device of claim 15, wherein the first verification information is determined based on the first one or more compensation parameters.

* * * * *